United States Patent [19]

Bernauer et al.

[11] Patent Number: 4,583,638
[45] Date of Patent: Apr. 22, 1986

[54] PRESSURE-TIGHT VESSEL FOR THE STORAGE OF HYDROGEN IN A METAL MATRIX BODY

[75] Inventors: Otto Bernauer, Weinstadt; Robert Wagner, Fellbach, both of Fed. Rep. of Germany

[73] Assignee: Daimler-Benz Aktiengesellschaft, Fed. Rep. of Germany

[21] Appl. No.: 661,430

[22] Filed: Oct. 16, 1984

[30] Foreign Application Priority Data

Oct. 18, 1983 [DE] Fed. Rep. of Germany ....... 3337754

[51] Int. Cl.$^4$ ............................................. F17C 11/00
[52] U.S. Cl. ......................................... 206/0.7; 62/48
[58] Field of Search ...................... 206/0.7, 0.6; 220/3; 62/48

[56] References Cited

U.S. PATENT DOCUMENTS

| | | | |
|---|---|---|---|
| 2,987,175 | 6/1961 | Bottum | 206/0.6 |
| 4,396,114 | 8/1983 | Golben et al. | 206/0.7 |
| 4,489,564 | 12/1984 | Hausler et al. | 206/0.7 X |
| 4,495,775 | 1/1985 | Young et al. | 206/0.7 X |
| 4,510,759 | 4/1985 | Sakai et al. | 62/48 |

*Primary Examiner*—Steven M. Pollard
*Attorney, Agent, or Firm*—Craig and Burns

[57] ABSTRACT

A pressure-tight vessel for the storage of hydrogen in a metal matrix body and in which a matrix body is arranged in a tube preferably made of aluminum, the outside diameter of the matrix body before activation is less than the inside diameter of the vessel, and in which discs are provided filling the tube cross-section, which discs rest against the end faces of the matrix body and are displaceable axially outwards against resistance within the tube, as a result of which it becomes possible for the matrix body to expand in the axial direction. For a faster absorption and emission of hydrogen, the matrix body is preferably provided with a central extraction tube which is guided through the discs. Any deformation of the vessel as a result of changes in volume of the matrix body is avoided by this construction.

11 Claims, 1 Drawing Figure

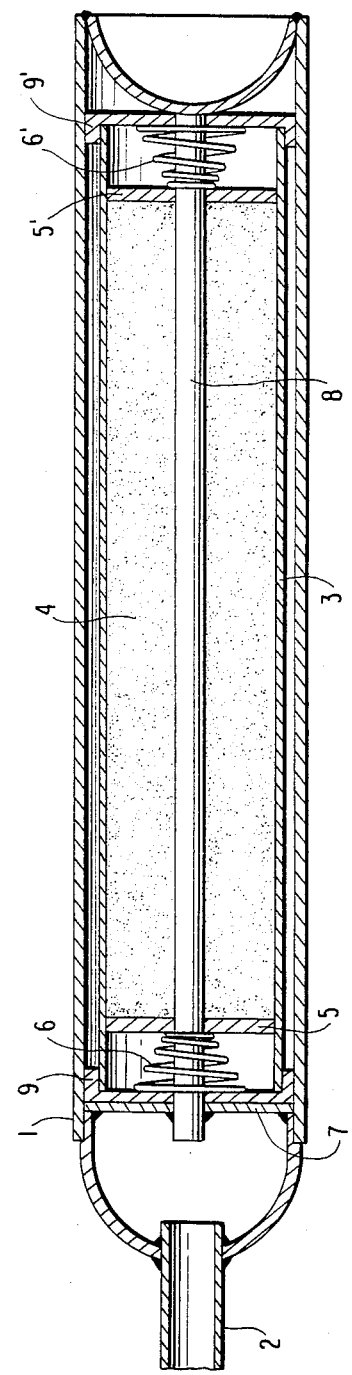

PRESSURE-TIGHT VESSEL FOR THE STORAGE OF HYDROGEN IN A METAL MATRIX BODY

The subject of the invention is a pressure-tight vessel for the storage of gaseous hydrogen in the form of metal hydrides which are secured mechanically in a metal matrix body.

During the charging of hydride-forming alloys with hydrogen and the discharging of hydrogen from them, the X-ray density of the solid body varies up to 25%. This presents a considerable number of problems with regard to the construction of the vessels, since the vessel wall is not supposed to do any work or is supposed to do only a very small amount of work. Although it has been possible to reduce these difficulties by securing the storage material in metal matrix bodies, nevertheless the problem has not yet been solved completely.

The object of the invention is to provide a pressure-tight vessel for the storage of hydrogen in a metal matrix body which guarantees only slight bulging even over many charging and discharging cycles.

This object is achieved by provision of a pressure-tight vessel with a metal matrix body, the matrix body being arranged within the vessel in a tube, of which the outside diameter before activation is less than the inside diameter of the pressure-tight vessel, and discs filling the tube cross-section rest against the end faces of the matrix body and are displaceable outwards against the resistance within the tube, that is to say of the end faces the matrix body are pressed together by these discs, but the matrix body can expand axially against this resistance.

The difference between the outside diameter of the tube and the inside diameter of the vessel must be calculated so that the radial bulging of the tube, occurring as a result of activation of the matrix body when it is charged with hydrogen, is less than or at most equal to this difference. The bulging of the tube depends, for example, on the diameter of the tube and on the nature of the storage material used and can easily be determined at any time by means of a simple preliminary test.

The tube containing the matrix body can be placed loosely in the vessel, but it is preferable to mount the tube, at its ends not filled by the matrix body, within the vessel at a distance from the vessel wall, for example, concentrically.

The discs resting against the end faces of the matrix body are displaceable outwards against a resistance, so as also to allow axial expansion of the matrix body during activation. The resistance can be formed, for example, by a spring ring which is attached in the tube and against which the disc pushes outwards when the matrix body expands, overcoming its frictional resistance in the tube, or alternatives the disc can be provided on its outside with a piston-shaped shank which rests against the inner wall of the vessel under a specific prestress. It is particularly favorable if the resistance is generated by a spring.

Other objects, features, and advantages of the present invention will become more apparent from the following description when taken in connection with the accompanying drawing which shows, for the purposes of illustration only, one embodiment in accordance with the present invention, and wherein:

Turning now to the single FIGURE wherein like elements are designated by like reference numerals, the pressure-tight steel vessel 1 is provided with an extraction tube 2. Located within the vessel 1 is the matrix body or pressed blank 4 which can be produced from a pressed blank consisting of the metal-forming alloy and aluminum or copper powder. The pressed blank 4 is located in the envelope 3 which is mounted at its ends at a distance from the vessel wall by means of the centering discs 9 and 9'. Discs 5 and 5', which compress the pressed article axially, rest against the end faces of the pressed blank 4 under spring prestress. The springs 6 and 6' exerting the pressure are supported on the centering discs 9 and 9'. The centering disc 9 is shown in the FIGURE as resting on the one hand against the vessel bottom and on the other hand against a supporting plate 7 fastened in the vessel. Centering disc 9' is disclosed as resting against the vessel bottom, that is, the cylinder 1, and may rest against a supporting plate similar to plate 7, such a plate not being shown in the FIGURE.

Furthermore, for better hydrogen absorption and emission, there is a central extraction tube 8 which comprises a porous material allowing the passage of hydrogen. The envelope comprises a high-strength expandable material which is resistant to hydrogen even under alternating pressure stress. Aluminum and its alloys, aluminum/silicon/magnesium alloys, for example, are preferred as material for the envelope 3. The disc 5 can likewise be comprised of this material inasmuch as the hydrogen is removed from the accumulator through a central extraction tube. If the central extraction tube is omitted, the closing discs 5 and 5' must be permeable to hydrogen, that is to say, comprise a porous material. It goes without saying, moreover, that the centering discs 9 and 9' and the supporting plate 7 are provided with orifices which allow the passage of hydrogen. By means of the envelope 3, it is possible for the matrix body 4 to expand in the radial direction, without bulging the vessel wall 1, while the discs 5 allow the matrix body 4 to expand in the axial direction. The distance between the vessel wall 1 and the envelope 3 must be calculated so that it is possible for the matrix body 4 to expand without bulging the outer wall 1, a distance of a few milimeters generally being sufficient for this purpose. It is especially favorable to calculate the distance between the vessel wall 1 and the envelope 3 so that, when it bulges radially, the envelope 3 just comes up against the vessel wall 1, thereby also guaranteeing a good transmission of heat from the vessel wall 1 to the matrix body 4.

To achieve a better transmission of heat from the steel vessel to the matrix body 4 located in envelope 3, it is advantageous, in the case of greater distances between the envelope 3 and vessel wall 1, if the gap between the vessel wall 1 and the envelope 3 is filled with a compressible material of high thermal conductivity, for example steel wool, steel chips or copper chips. However, the quantity of compressible material should not be so great that the vessel wall 1 is deformed when the envelope 3 bulges. Only a slight play of a few millimeters is required in the axial direction also, and this has to be absorbed by the resilient discs 5 and 5'.

EXAMPLE

A metal matrix body with a diameter of 24 mm was produced by pressing 5% aluminum powder with 95% of a storage alloy of the composition $Ti_{0.4}Fe_{0.1}Cr_{0.05}Mn_{1.5}$ and was fitted into an aluminum tube having a diameter of 25.5 mm and a wall thickness of 0.75 mm. This tube was then mounted concentrically in a steel vessel having an inside diameter of 28.5 mm and a wall thickness of 0.75 mm. The matrix body was provided with two axial closing discs which rests flush on the vessel bottom, so that the matrix body had no play available for expansion in the axial direction.

The matrix body was charged and discharged ten times and the bulging of the outer vessel was then determined. Bulging of the outer vessel after these ten cycles was more than 2.5%, the final density of the matrix body after these ten cycles amounting to 3.8 g per cm$^3$.

The test was repeated, with the difference that the matrix body was closed off axially by means of discs which were under spring prestress, the springs of the discs allowing a travel in the axial direction of 4 mm in each case. After ten cycles, the bulging of the outer vessel was 0%, and the final density of the pressed blank was approximately 4 g per cm$^3$.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A pressure-tight vessel for the storage of hydrogen in a metal matrix body, wherein the matrix body is arranged within the vessel in an envelope tube, of which the outside diameter before activation of the matrix body is less than the inside diameter of the vessel, and disc means filling the tube cross-section rest against the end faces of the matrix body for displacement under resistance outwards within the tube.

2. A pressure-tight vessel according to claim 1, wherein the envelope has ends not filled by the matrix body and is mounted within the vessel at a distance from a vessel wall.

3. A pressure-tight vessel according to claim 1, wherein the disc means are displaceable against resistance of a spring.

4. A pressure-tight vessel according to claim 1, wherein the tube has a strength of at least 170 N/mm$^2$.

5. A pressure-tight vessel according to claim 1, wherein the envelope comprises aluminum or an aluminum alloy.

6. A pressure-tight vessel according to claim 1, wherein a gap between the tube and the vessel wall is filled with a compressible material of high thermal conductivity.

7. A pressure-tight vessel according to claim 1, wherein the matrix body is provided with a central extraction tube which extends through the disc mens.

8. A pressure-tight vessel according to claim 7, further comprising means for centering the central extraction tube within the envelope tube and for spacing the envelope tube within the pressure-tight vessel.

9. A pressure-tight vessel according to claim 8, further comprising at least one supporting plate disposed between the extraction tube and the pressure-tight vessel and contiguous to a centering disc.

10. A pressure-tight vessel according to claim 9, wherein at least one of the disc means comprises a porous material for passing hydrogen.

11. A pressure-tight vessel according to claim 10, wherein at least one of the centering discs and the supporting plate are provided with orifice means for allowing passage of hydrogen.

* * * * *